United States Patent
Akiyama

[15] 3,699,859
[45] Oct. 24, 1972

[54] AUTOMATIC FLASH BULB TRIGGERING DEVICE FOR USE IN EVER-SET TYPE ELECTRONIC SHUTTER

[72] Inventor: Hideaki Akiyama, Tokyo, Japan
[73] Assignee: Ricoh Co., Ltd., Tokyo, Japan
[22] Filed: Jan. 27, 1971
[21] Appl. No.: 110,129

[30] Foreign Application Priority Data

Feb. 2, 1970 Japan..................45/9077

[52] U.S. Cl.............95/11.5 R, 95/10 CT, 95/53 EB
[51] Int. Cl.................................G03b 9/70
[58] Field of Search...95/10 CT, 11 R, 11.5 R, 53 EB

[56] References Cited

UNITED STATES PATENTS

| | | | |
|---|---|---|---|
| 3,460,451 | 8/1969 | Starp et al. | 95/10 CT |
| 3,502,011 | 3/1970 | Rentschler et al. | 95/10 CT |

Primary Examiner—Samuel S. Matthews
Assistant Examiner—Fred L. Braun
Attorney—Henry T. Burke, Robert Scobey, Robert S. Dunham, P. E. Henninger, Lester W. Clark, Gerald W. Griffin, Thomas F. Moran, R. Bradlee Boal and Christopher C. Dunham

[57] ABSTRACT

An automatic flash triggering device comprising first and second armature levers that are actuated by an electromagnet connected to the output trigger circuit of a Schmitt circuit which energizes the electromagnet when the brightness of light incident upon a CdS element is below a predetermined level. The first lever controls the camera shutter mechanism and the second turns on a warning lamp and switches the mechanism to a predetermined low shutter speed if a flash bulb is mounted in place. The second lever will not function when the brightness of incident light is higher than a predetermined level while the first lever is actuated. When the brightness is less than a predetermined level, both the first and second levers are actuated the latter operating a suitable mechanism such that the shutter opens at a predetermined slow shutter speed and the flash is fired for proper exposure.

2 Claims, 6 Drawing Figures

INVENTOR.
HIDEAKI AKIYAMA 3,699,859

AUTOMATIC FLASH BULB TRIGGERING DEVICE FOR USE IN EVER-SET TYPE ELECTRONIC SHUTTER

BACKGROUND OF THE INVENTION

The present invention relates to generally an electronic shutter for cameras and more specifically an automatic flash bulb triggering device which may be incorporated in an electronic shutter and which utilizes an electromagnet in the electronic shutter so that when the brightness of a subject is less than a prescribed level, a flash bulb, when it is mounted, may be automatically triggered or flashed and an underexposure signal may be generated.

There has been proposed an automatic flash bulb triggering device for a full-automatic exposure camera having a built-in exposure meter, in which device when an exposure meter is not activated (because of a low brightness of a subject) a flash contact is closed for flash exposure. In order to detect whether the exposure meter is activated or not, this device utilizes a member which is made in engagement with or released from a pointer of the exposure meter so as to sense an angle of rotation of the pointer. However, an exposure time setting mechanism in the electronic shutter has no mechanically actuating or mechanically actuated member and consists solely of an electronic circuit components, so that the switching to flash exposure becomes extremely difficult. Therefore, an extra driving source such as a strong magnet or motor is required, so that the electronic shutter becomes complex in construction and expensive to manufacture.

SUMMARY OF THE INVENTION

One of the objects of the present invention is, therefore, to provide an electronic shutter which overcomes the problems encountered in the conventional fully-automatic exposure camera having a built-in exposure meter.

Another object of the present invention is to provide an improved electronic shutter having a simple mechanism which may automatically permit turning on an exposure warning lamp and switching to flash exposure when the brightness of a subject is lower than a predetermined level.

Another object of the present invention is to provide an improved electronic shutter which when a flash bulb is mounted, may automatically determine an aperture stop in response to the actuating of a ring for setting a distance between the camera and a subject, that is in response to the focusing operation.

According to the present invention, a first and second armature levers are actuated by an electromagnet connected to an output circuit of a Schmitt trigger circuit which is energized in response to the brightness of light incident upon a CdS element. The first armature lever is used for controlling the shutter and the second armature lever is used to turn on or turn off an exposure warning lamp and to switch a shutter actuating circuit to actuate the shutter at a predetermined lower shutter speed when a flash bulb is mounted. When the brightness of the subject, that is the brightness of light incident upon the CdS element is higher than a predetermined level, the second armature lever is not actuated while the first armature lever is actuated. On the other hand, when the brightness of incident light is less than the predetermined level, the second armature lever is actuated so as to turn on the warning lamp and when a flash bulb is mounted the second lever switches the shutter actuating circuit so as to actuate the shutter at a predescribed slow shutter speed, that is a speed suitable for flash exposure and fires the flash.

According to another aspect of the present invention, when the brightness of incident light is less than a predetermined level, a control pin for actuating an aperture stop setting lever is automatically switched to engage with a cam associated with focusing operation, so that an aperture stop may be automatically determined in response to a distance between the subject and camera in case of flash exposure.

The present invention will become more apparent from the following description of the preferred embodiments thereof taken in conjunction with the accompanying drawing.

Figure 1:
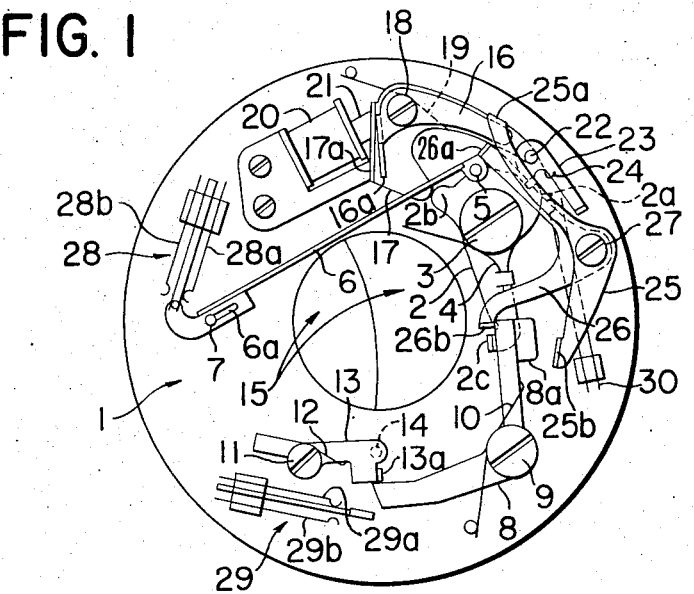
FIG. 1 is a schematic view illustrating the interior of an electronic shutter incorporating therein an automatic flash bulb triggering device in accordance with the present invention.
Figure 3:
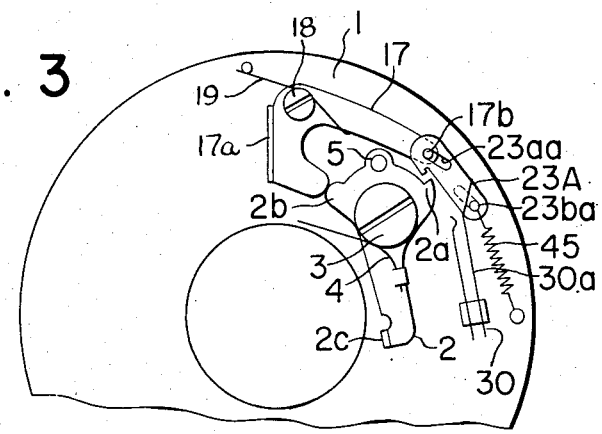
FIG. 3 is a schematic view illustrating only the essential component parts of a second embodiment of the present invention in which the aperture stop setting is automatically made depending upon a distance between a subject and a camera.

DESCRIPTION OF THE PREFERRED EMBODIMENTS:

Referring to FIG. 1 illustrating an electronic shutter according to the present invention, a shutter release lever 2 is rotatably fixed to a base 1 by a pivot 3 and is normally biased to rotate in the clockwise direction under the force of a spring 4 loaded between the base 1 and the shutter release lever 2. On the side of the rear surface of the shutter release lever 2 an auxiliary shutter release lever (not shown) adapted to be actuated in response to the depression of a shutter release button (not shown) is also rotatably carried with the pivot 3 for rotation in unison with the shutter release lever 2. More specifically, the shutter release lever 2 is caused to rotate in the counterclockwise direction against the spring 4 when the shutter release button is depressed. It is seen that the shutter release lever 2 is provided with a stepped portion 2a, a projection 2b and an upright projection 2c as best shown in FIG. 3.

A pin 7 extending from the base 1 is loosely fitted into an elongated slot 6a at one end of a change-over lever 6 rotatably fixed to the shutter release lever 2 by a pivot 5. A driving lever 8 rotatably fixed to the base 1 by a pivot 9 is loaded with a spring 10 and has a sloping projection 8a formed integrally at one end thereof in opposed relation with the upright projection 2c of the shutter release lever 2. The other end of the driving lever 8 is normally in opposed relation with a tapered projection 13a of a shutter blade lever 13 rotatably fixed to the base 1 by a pivot 11 and loaded with a spring 12. A downwardly extending pin 14 of the shutter blade lever 13 is adapted to engage and rotate shutter blades 15 in a conventional manner such as by riding in crossed-slots in the shutter blades.

First and second armature levers 16 and 17 of magnetic material are carried on a common shaft 18 and a spring 19 is loaded between the base 1 and the second armature lever 17. The upright projections or armatures 16a and 17a of the first and second armatures levers 16 and 17 are in opposed relation with a pole 21 of a magnet 20 securely fixed to the base 1. Between a switch lever 23 pivotably fixed to the second armature lever 17 at its leading end by a pivot 22 and the second armature lever 17 is loaded a spring 24.

A first and second connecting levers 25 and 26 are carried on a common pivot 27. One end of the first armature lever 16 is interposed between the downward and upright projections 25a and 26a of the first and second interconnecting levers 25 and 26 and another upright projection 25b extending from the other end of the first connecting lever 25 is normally within the path of rotation of the sloping projection 8a of the driving lever 8. The upright projection 26b extending from the other end of the second connecting lever 26 is adapted to stop the rotation of the driving lever 8 so as to keep the shutter blade opened.

Change-over switches 28, 29 and 30 fixed to the base 1 are closed and opened by the change-over lever 6, the blade lever 13 and the switch lever 23 respectively. Change-over switch 42 fixed to the underside of the base 1 (FIG. 4) may be suitably operated by lever 23.

Figure 2:
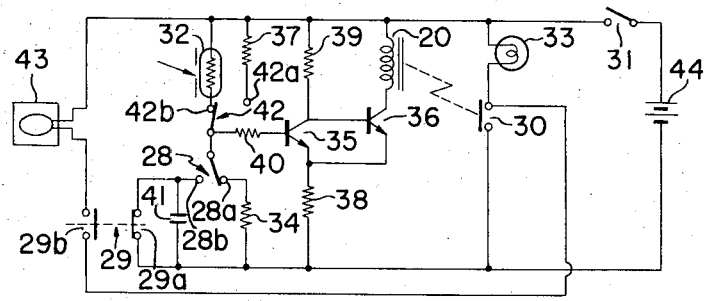
FIG. 2 is a circuit diagram thereof.

Next referring to FIG. 2 illustrating the circuit diagram of the electronic shutter, reference numeral 20 designates the magnet described above; 28, 29 and 30, the change-over switches described above, the switches 28 and 29 having contacts 28a, 28b and 29a and 29b respectively; 31, a main switch to be closed by a shutter release lever (not shown); 32, a CdS element; 33, a warning lamp; 34, a resistor of the lamp 33; 35 and 36, first and second transistors; 37, a resistor for low shutter speed; 38, 39 and 40, resistors; 41, a capacitor; 42, a change-over switch having contact 42a and 42b (see FIG. 4) a flashbulb 43, and a battery 44. The Schmitt circuit is constituted by the first and second transistors 35 and 36, the resistors 38, 39 and 40 and the magnet 20.

Next the mode of operation will be described. Upon depression of the shutter release button (not shown) the main switch 31 is closed while the shutter release lever 2 drivingly coupled to the shutter release button is rotated in the counterclockwise direction against the spring 4 so that the upright projection 2c of the lever 2 causes the driving lever 8 to rotate in the clockwise direction against the force of the spring 10. The other end of the driving lever overrides the sloping projection 13a of the shutter blade driving lever 13 and the spring 10 is now loaded. The second armature lever 17 is released from engagement with the projection 2b of the shutter release lever 2 so that it may be permitted to rotate in the counterclockwise direction under the force of the spring 19.

The contact 28a of the change-over switch 28 is normally closed. When the brightness of a subject is higher than a predetermined level, the first transistor 35 is saturated while the second transistor 36 is turned off so that no current flows through the coil of the magnet 20. That is the magnet 20 remains de-energized, so that the second armature lever 17 is rotated in the counterclockwise direction under the force of the spring 19. The armature or upright projection 17a of the second armature lever 17 is moved away from the pole 21 and the switch lever 23 at the other end of the armature lever 17 is moved to a position in which the switch lever 23 does not engage with the stepped portion 2a of the shutter release lever 2.

Upon rotation of the driving lever 8 caused by the rotation of the shutter release lever 2, the upright end 25b of the first connecting lever 25 is pushed so that the lever 25 is rotated in the counterclockwise direction. The first armature lever 16 is caused to rotate in the clockwise direction by the upright projection 25a of the first connecting lever 25. As the armature or upright projection 16a of the first armature lever 16 approaches the pole 21, the normally-closed contact 28a of the change-over switch 28 is opened and the contact 28b is closed by movement of the change-over lever 6, through pivot 5 on lever 2. In the circuits the contact 29a of the change-over switch 29 is normally closed, the voltage across the capacitor 41 is zero. Thus, when contact 28b closes the first transistor 35 is turned off while the second transistor 36 is turned on so that the magnet 20 is energized, thereby attracting the armature 16a of the first armature lever 16 to the pole 21.

When the shutter release lever 2 is further rotated, the driving lever 8 is released from the shutter release lever 2, so that the lever 8 is rotated in the counterclockwise direction under the force of the spring 10 and the other end of the lever 8 pushes the tapered projection 13a of the shutter blade driving lever 13, thereby rotating it in the clockwise direction against the spring 12. Therefore, the shutter blade 15 is opened by the pin 14 of the lever 13 and in this case the driving lever 8 is stopped by the upright projection 26b of the second connecting lever 26, so that the other end of the driving lever 8 engages with the upright projection 13a of the shutter blade driving lever 13 to thereby stop it. Upon rotation of the shutter blade driving lever 13, the contact 29a is opened while the contact 29b is closed in the change-over switch 29 so that the capacitor 41 is started to be charged. The flashbulb does not fire since switch 30 is open keeping it out of circuit with the battery 44. When the voltage across the capacitor 41 reaches a predetermined level, the first transistor 35 is turned on while the second transistor 36 is turned off thus de-energizing the magnet 20. In consequence, the first armature lever 16 is released from the pole 21 so that the second connecting lever 26 is now permitted to rotate. The driving lever 8 is further rotated under the force of the spring 10 to release the shutter blade driving lever 13 so that the lever 13 is returned to its initial position under the force of the spring 12 thereby closing the shutter blade 15.

Figure 4:
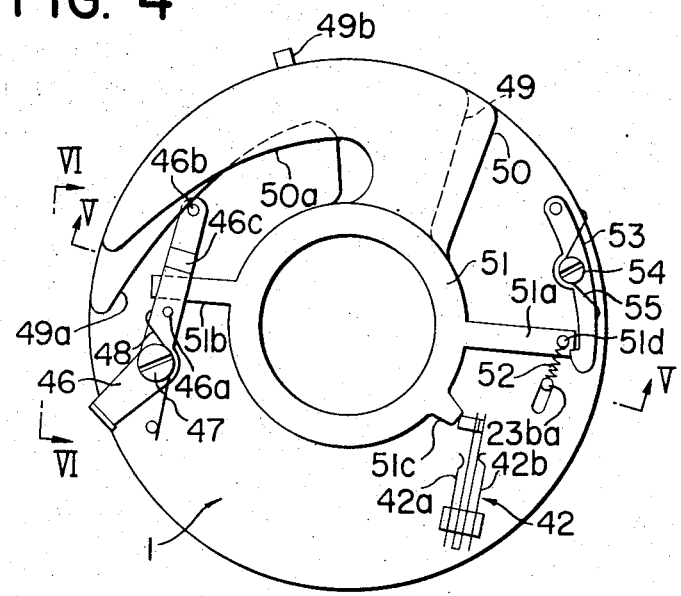
FIG. 4 is a schematic rear view thereof illustrating component parts of a mechanism for automatically setting an aperture stop depending upon the distance between the subject and the camera.

When the brightness of the subject is lower than a predetermined level, the first transistor 35 remains in the unconducting state while the second transistor 36 is turned on so that the magnet 20 is energized. In consequence, even when the second armature lever 17 is released upon rotation of the shutter release lever 2, the second lever 17 is attracted by the pole 21 and held against the action of spring 19. The stepped portion 2a of the shutter release lever 2 pushes the switch lever 23 rotating it clockwise so that the switch 30 is closed, thereby turning on the warning lamp 33 to give a warning that the exposure is to be made at a low speed such as 1/30 second. The warning signal may be so arranged as to be viewed in the field of the viewfinder or at any other suitable location of the camera. When the shutter release button is further depressed the shutter release lever 2 is further rotated and thereby lever 6 is moved so that the contact 28a is opened in the change-over switch 28 while the contact 28b is closed. Since the contact 29a in the changeover switch 29 is normally closed, one end of the resistor 40 is grounded, so that the first transistor 35 will not conduct and the second transistor 36 remain on, In consequence, the magnet 20 remains energized thus attracting and holding both the first and second armature levers 16 and 17 to the pole 21. Upon further rotation of the shutter release lever 2, the contact 42a is opened while the contact 42b is closed by switch lever 23 in a suitable manner such as shown in FIG. 4. The shutter blade 15 is opened by the action of shutter blade driving lever 13 as described above and simultaneously the contact 29b is closed while the contact 29a is opened so that the flashbulb 43 is put in circuit with battery 44 and fired and the capacitor 41 is started to be charged with a time constant determined by the capacitance of capacitor 41 and the resistance of the CdS element 32. In consequence, the potential at the junction between the resistor 40 and the change-over switch 42 is increased to a predetermined lever at which the first transistor 35 is turned on while the second transistor 36 is turned off. Thereupon both the first and second armature levers 16 and 17 are released from the magnet 20. The second connecting lever 26 is permitted to rotate in turn permitting rotation of lever 8 and release of lever 13 so that the shutter blade 15 is closed while lever 23 rotates to permit the change-over switch 30 to be opened. Thus the exposure at low speed is accomplished.

Figure 5:
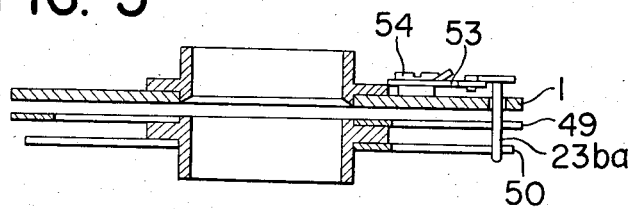
FIG. 5 is a sectional view taken along the line V—V in FIG. 4.

The second embodiment is substantially similar to the first embodiment described hereinabove except that the aperture stop is set in response to the focusing operation. A lever 23A which corresponds to the switch lever 23 in the first embodiment is guided by a pin 17b of the second armature lever 17 fitted into an elongated slot 23aa formed in one end of the lever 23A. A pin 23ba extending from the other end of the lever 23A passes through the base 1 as best shown in FIG. 5. The lever 23A is loaded with a spring 45. The movable contact 30a of the change-over switch 30 is actuated by the pin 23ba so as to make and break the switch 30.

As shown in FIG. 4 an aperture lever 46 of elastic material is rotatably fixed to the rear surface of the base 1 with a pivot 47 and a spring 48 is loaded between the base 1 and the lever 46. An aperture blade actuating pin 46a extending from the aperture lever 46 is fitted loosely in an elongated slot of an aperture blade (not shown) so as to open and close it in response to the rotation of the lever 46. It should be noted that the aperture lever 46 is drivingly coupled to the shutter release lever 2. The angle of rotation of the aperture stop setting lever 46 and accordingly an aperture stop is controlled by a control pin 46b extending from the other end of the lever 46 and being in contact with the cam surfaces 49a and 50a of an aperture plate cam 49 and a focusing cam 50 as viewed from FIG. 4. Both of the aperture and focusing cams 49 and 50 and an aperture coupling ring 51 are rotatably fixed concentrically of the optical axis of the taking lens (not shown). A projection 49b of the aperture cam 49 is drivingly coupled to an aperture setting ring which may be rotated from the exterior of the camera. The focusing cam 50 is drivingly coupled to a focusing ring. A spring 52 is loaded between the pin 23ba and a pin 51d extending from a projection 51a of the aperture coupling ring 51. The spring 52 exerts no force in the position indicated in FIG. 4. A second projection 51b of the aperture coupling ring 51 is for engagement with a sloping portion 46c of the lever 46 while a third projection 51c is adapted to actuate the movable contact of the change-over switch 42 to make and break its contacts 42a and 42b. An engaging lever 53 for engagement with the pin 51d is rotatably fixed to the base 1 with a pivot 54 and a spring 55 is loaded between the lever 53 and the base 1 in such a manner that the lever 53 may be rotated in the counterclockwise direction when a flash bulb is attached to the camera, so as to release the pin 51d.

Next the mode of operation of the second embodiment will be described. When the brightness of the subject is sufficient, the mode of operation is substantially similar to that of the first embodiment described above. Upon depression of the shutter release button (not shown) the aperture blade is driven by the aperture lever 46 and upon rotation of the lever 46 the control pin 46b is stopped by the cam surface 49a of the aperture cam 49 to thereby set an aperture stop.

Figure 6:
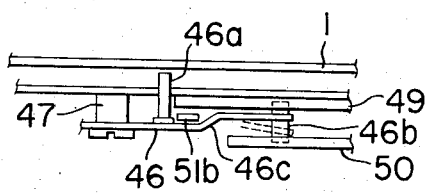
FIG. 6 is a side view looking in the direction indicated by the arrow VI—VI in FIG. 4.

When the brightness of the subject is lower than a predetermined level, the change-over switch 30 is closed thereby turning on the lamp 33 giving a warning. When the operator stops depressing the shutter release button so as to load a flash bulb or a flash bulb is already loaded, the engaging lever 53 is rotated in the counterclockwise direction so as to release the pin 51d. The stepped portion 2a of the shutter release lever 2 actuates the lever 23A so as to close the switch 30 while the pin 23ba causes the aperture coupling disk 51 to rotate in the clockwise direction through the spring 52 so that the projection 51b raises the leading end of the aperture lever 46 to the position indicated by the two-dot lines in FIG. 6, thereby engaging the pin 46b with the focusing cam 50. In consequence, the angle of rotation of the aperture lever 46 is controlled by the cam surface 50a of the focusing cam 50 so that an aperture stop may be set depending upon the distance from the camera to the subject.

Upon rotation of the aperture coupling ring 51, the contact 42b of the change-over switch 42 is opened while the contact 42a is closed so that a shutter speed is determined not by the resistance of the CdS element 32 but by the resistor 37. That is, the shutter speed is fixed to a predetermined shutter speed such as 1/30 second.

Upon further rotation of the shutter release lever 2, the contact 28b of the change-over switch 28 is closed and the lever 13 is rotated in the clockwise direction so that the shutter blade 15 is opened while the contact 29a is opened and the contact 29b is closed thereby triggering the flash bulb. The first armature lever 16 is released 1/30 second after the shutter blade is opened so that the it is closed again.

What is claimed is:

1. An automatic flashbulb triggering device for a camera having an ever-set type electronic shutter comprising:
   a. an electronic shutter circuit including:
      i. an electromagnet with a pole face,
      ii. a Schmitt trigger circuit for controlling the energizing of said electromagnet,
      iii. a photoconductive element for controlling the switching of said Schmitt trigger circuit such that when the brightness of a subject is below a predetermined level said Schmitt trigger circuit will energize said electromagnet,
      iv. an exposure warning lamp circuit,
      v. a flashbulb firing circuit, and
      vi. a voltage source
   b. a shutter release mechanism for connecting said electronic shutter circuit to said voltage source and operating said electronic shutter;
   c. a first armature lever which is normally spaced apart from said pole face of said electromagnet;
   d. a second armature lever which is normally held in engagement with said pole face of said electromagnet and spring biased for movement away from said pole face;
   e. third lever means having a first member operatively coupled to said shutter release mechanism and a second member engaging said first armature lever for moving it toward engagement with said pole face of said electromagnet;
   f. a shutter release lever operatively coupled to said first and said second armature levers and said third lever means so that upon rotation of said shutter release lever said first armature lever is moved toward said pole face of said electromagnet by the cooperation of said first and second members and said second armature levers is released and moved away from said pole face of said electromagnet and said third lever means operates said shutter release mechanism;
   g. a fourth lever connected to said second armature lever and movable into and out of the path of rotation of said shutter release lever in unison with said second armature lever and displaceable by said shutter release lever when said second armature lever is attracted and held by said energized electromagnet;
   h. a switch actuable in response to the displacement of said fourth lever by said shutter release lever to close said exposure warning lamp circuit; and
   j. a changeover switch actuable in response to the operation of said shutter release mechanism by said third lever means to close said flashbulb firing circuit when said exposure warning lamp circuit is closed.

2. An automatic flashbulb triggering device as in claim 1 further comprising:
   k. an aperture blade operating lever coupled to said shutter release lever;
   l. an aperture blade stop setting cam surface;
   m. a control member on said aperture blade operating lever for controlling the aperture blade stop setting and engaging and riding on said aperture blade stop setting cam surface;
   n. a focusing cam surface set in accordance with the camera focus setting; and
   o. an aperture coupling ring operatively coupled to said fourth lever and said aperture blade operating lever and actuable in response to the displacement of said forth lever so as to release the engagement of said control member with said aperture blade stop setting control cam surface and to make said control member engage with said focusing cam surface, whereby when the brightness of a subject is less than a predetermined level, said aperture coupling ring is actuated to switch control of the aperture blade stop setting to the focusing cam surface so that the stop setting may be determined by the distance between the subject and the camera.

* * * * *